United States Patent
Hartigan et al.

[19]

[11] Patent Number: 6,035,491
[45] Date of Patent: Mar. 14, 2000

[54] HINGE CONTROL MECHANISM FOR A FOLDABLE DEVICE

[76] Inventors: Michael J. Hartigan, 1260 SW. 14th Dr., Boca Raton, Fla. 33486; Michael P. Goldenberg, 1215 Crestwood Dr., Delray Beach, Fla. 33483

[21] Appl. No.: 09/085,069

[22] Filed: May 4, 1998

[51] Int. Cl.[7] .................................................. E05C 17/64
[52] U.S. Cl. ............................................... 16/342; 16/336
[58] Field of Search ........................... 16/342, 335, 336; 361/681–683; 364/708.1; 248/917–923; 403/351, 365, 371

[56] References Cited

U.S. PATENT DOCUMENTS

| | | | |
|---|---|---|---|
| 1,166,551 | 1/1916 | Simmons ................................... | 16/342 |
| 2,458,707 | 1/1949 | Jacobs ....................................... | 16/342 |
| 4,617,699 | 10/1986 | Nakamura ................................ | 16/342 |
| 4,734,955 | 4/1988 | Connor ..................................... | 16/342 |
| 5,052,078 | 10/1991 | Hosoi . | |
| 5,303,291 | 4/1994 | Takagi et al. . | |
| 5,682,645 | 11/1997 | Watabe et al. ............................ | 16/338 |
| 5,715,575 | 2/1998 | Kubota ...................................... | 16/342 |
| 5,765,263 | 6/1998 | Bolinas et al. ........................... | 16/342 |
| 5,918,348 | 7/1999 | Carpenter et al. ....................... | 16/342 |

*Primary Examiner*—Chuck Y. Mah
*Attorney, Agent, or Firm*—Randi L. Dulaney; Philip P. Macnak

[57] ABSTRACT

A foldable housing (11) for an electronic device (10) includes a body portion (12) and a flip portion (14). The flip portion (14) is rotatable joined to the body portion (12) by a relatively small hinge control mechanism (22). The hinge control mechanism (22) includes a U-shaped spring (28) having a pair of spring arms (42) and (44) between which a shaft (30) is located. As the flip portion (14) is moved, it rotates the spring arms (42), (44) around the shaft (30). Protuberances (34) and (36) on the shaft surface (32) deflect the spring arms (42), (44) to generate a force which varies with the amount of deflection and which holds the flip portion (14) in a closed position or in an open position, and allows the flip portion (14) to be adjusted from the open position to a read position selected by the user.

9 Claims, 5 Drawing Sheets

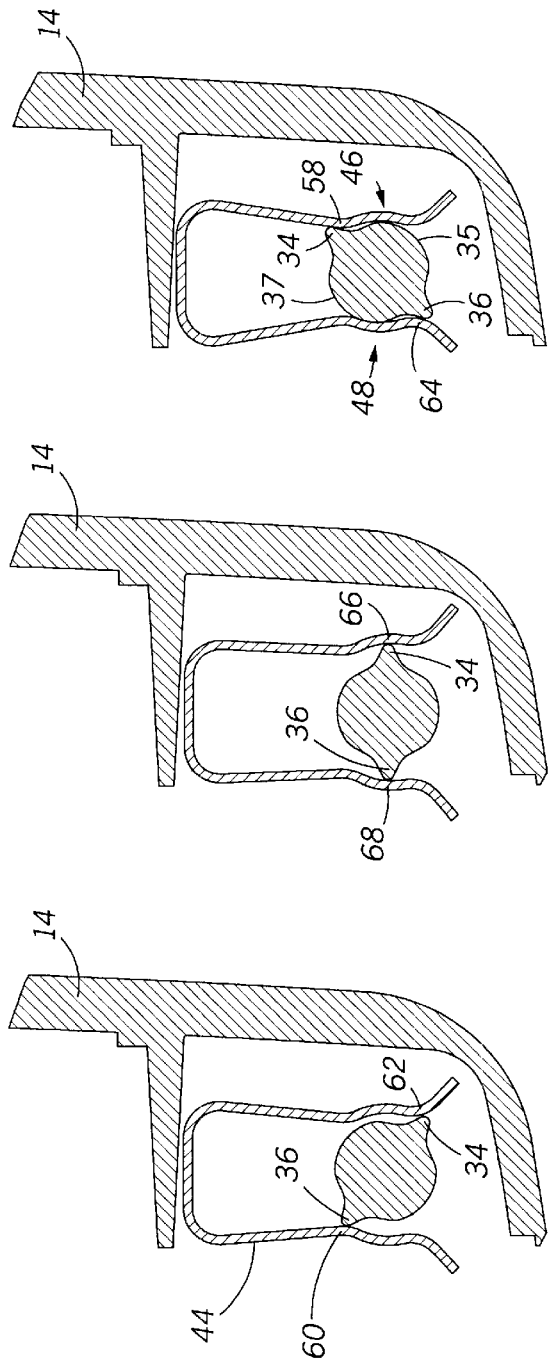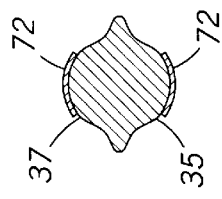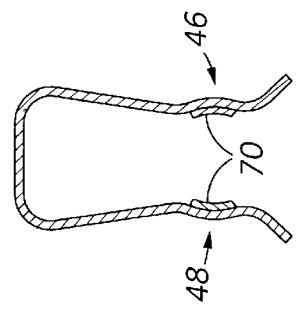

HINGE CONTROL MECHANISM FOR A FOLDABLE DEVICE

FIELD OF THE INVENTION

This invention relates in general to the field of foldable devices which have a body portion and a flip portion, and more specifically, to foldable devices that use a hinge mechanism to control the folding action between the body portion and the flip portion.

BACKGROUND OF THE INVENTION

Electronic devices such as pagers and cellular telephones sometimes have a two-part foldable housing that includes a body portion and a flip portion. The body portion houses most of the electronics, and the flip portion folds over the body portion. The flip portion typically contains a display and an antenna.

A hinge control mechanism is typically used to mechanically couple the body portion to the flip portion. The hinge control mechanism allows the flip portion to be rotated from a closed position (in which the flip portion covers the body portion) to an open position. The typical hinge control mechanism includes a shaft that rotates relative to a spring which the shaft bears on. When the flip portion is opened somewhat, the force generated by the spring being deflected by the shaft urges the flip portion to a fully open position and holds it in that position.

Electronic devices such as pagers and cellular telephones typically have a preset, opened position for active operation; and they lack provision for remaining opened in any position other than the preset position.

Electronic devices such as foldable portable computers typically lack a preset, opened position; instead, they have a frictional mechanism that allows the flip portion to be set at a plurality of positions with respect to the body portion.

BRIEF DESCRIPTION OF THE DRAWINGS

FIG. 7 illustrates the coaction between the shaft of FIG. 3 and the U-shaped spring of FIG. 5 when the foldable housing is in a closed position;

FIG. 8 illustrates the coaction between the shaft of FIG. 3 and the U-shaped spring of FIG. 5 when the foldable housing is in a slightly opened position;

FIG. 9 illustrates the coaction between the shaft of FIG. 3 and the U-shaped spring of FIG. 5 when the foldable housing is in a read position;

FIG. 10 illustrates an additional embodiment of the U-shaped spring of FIG. 5; and FIG. 11 illustrates an additional embodiment of the shaft of FIG. 3.

DESCRIPTION OF THE PREFERRED EMBODIMENT

Figure 1:
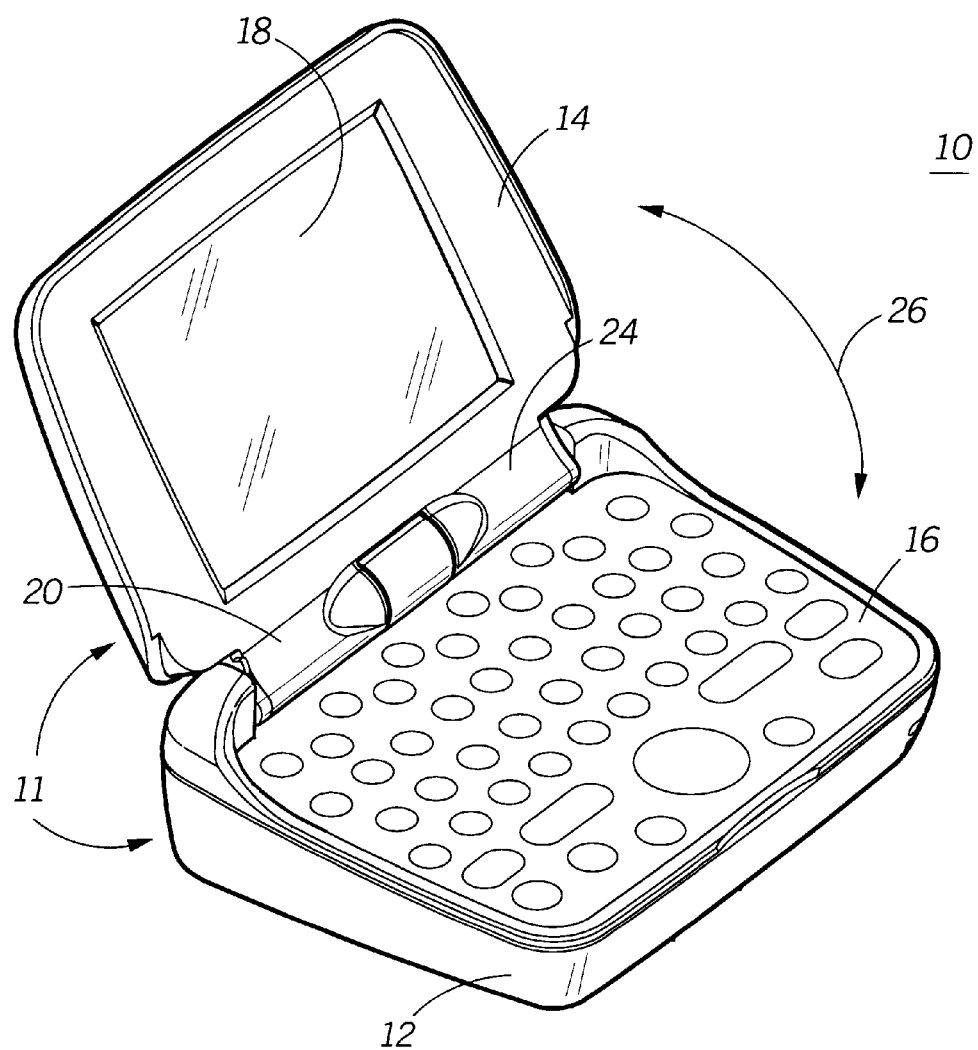
FIG. 1 is a perspective view of an electronic device that has a foldable housing in accordance with the invention.

Referring to FIG. 1, an electronic device 10 is shown in the form of a selective call transceiver capable of two-way radio frequency communication. The electronic device 10 has a foldable housing 11 that includes a body portion 12 and a flip portion 14. The body portion 12 encloses electronic circuitry and includes a keyboard 16 for use in composing a message that is to be transmitted by the electronic device 10. The flip portion 14 carries a display 18 that shows incoming messages and outgoing messages being composed by the user of the electronic device 10.

The flip portion 14 carries a rigid extension that forms a hinge receptacle 24. This hinge receptacle 24 is hollow and holds a hinge control mechanism 22 that is discussed below in more detail. The hinge receptacle 24, along with another rigid extension 20, couples the flip portion 14 to the body portion 12 so as to permit the flip portion 14 to rotate (in the direction of the arrow 26) between its illustrated position and a closed position in which it covers the keyboard 16.

The hinge control mechanism 22 allows the flip portion 14 to be: reliably and firmly held in a closed position; snapped open to a pre-set opened position for viewing the display 18; and adjusted from the pre-set opened position to a variable read position to permit a user to read the display 18 at a comfortable viewing angle. In a pre-set opened position, the flip portion is opened at an angle of about 90° relative to the body portion.

The electronic device 10 is usually worn in a holster that is attached to the user's belt. The electronic device 10, when in the holster, is held in an orientation that allows the user to move the flip portion 14 to the pre-set opened position to read an incoming message. This action places the flip portion 14 essentially parallel to the ground, with the display 18 facing upwardly where it can be viewed by the user while the electronic device 10 is still in its holster.

To compose and send a message, the user will usually remove the electronic device 10 from its holster and hold the body portion in both hands to use the keyboard 16. If the flip portion 14 is in the opened position (the flip portion 14 opened about 90° relative to the body portion 12), the display 18 may not be at a comfortable viewing angle to the user. Accordingly, the hinge control mechanism 22 permits the flip portion 14 to be opened further (beyond 90°) against a relatively small holding force until the flip portion 14 is in a "read" position, starting at about 100° from the base unit and continuing to about 170° from the base unit.

When the flip portion 14 has been rotated to the beginning of the read position, the hinge control mechanism 22 generates a relatively small holding force to resist further rotation of the flip portion 14. This holding force is sufficient to hold the display 18 at a selected viewing angle, yet allows the user to easily adjust the position of the display 18.

Figure 2:
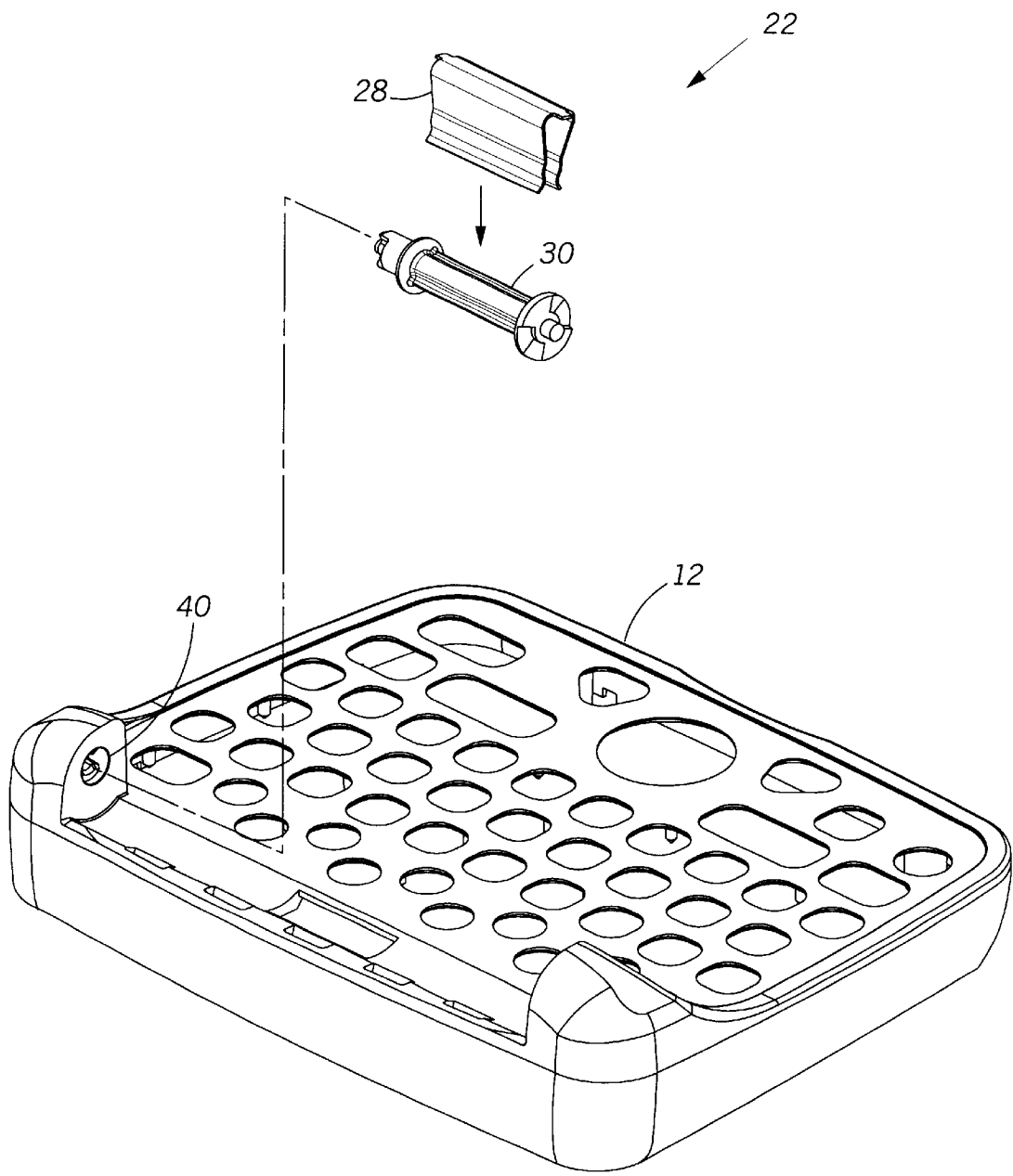
FIG. 2 is an exploded view of a hinge control mechanism used in the foldable housing shown in FIG. 1.

FIG. 2 is an exploded view of a hinge control mechanism 22 that fits into the hinge receptacle 24 in the foldable housing 11 shown in FIG. 1. The illustrated hinge control mechanism 22 includes a U-shaped spring 28 and a shaft 30. The shaft 30 is tangentially assembled to the U-shaped spring 28, the assembly is inserted into the hinge receptacle 24 of FIG. 1, and there they function as a hinge control mechanism 22 as described above. These functions are accomplished using components that easily fit into the relatively small hinge receptacle 24.

Figure 3:
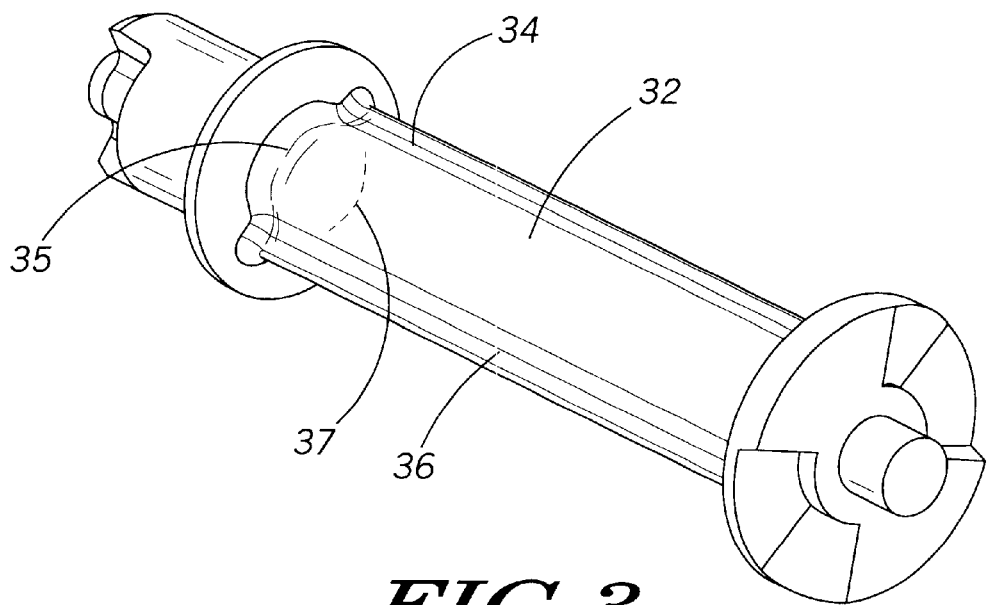
FIG. 3 is a perspective view of a shaft that forms part of the hinge control mechanism illustrated in FIG. 2.

The shaft 30, as shown in more detail in FIG. 3, is a unitary, plastic piece made of low friction, high wear material such as acetal, in the general form of a circular rod. A shaft surface 32 extends along the axis of the shaft 30.

The shaft surface 32 has an elliptical cross section with a pair of oppositely spaced rounded surfaces 35 and 37. The shaft surface 32 also has a pair of oppositely spaced protuberances 34 and 36. Each of these protuberances bears on and deflects the U-shaped spring 28. This deflection of the U-shaped spring 28 provides the force necessary to hold the flip portion 14 in a selected position, or to urge it to another position, as discussed in more detail later.

Figure 4:
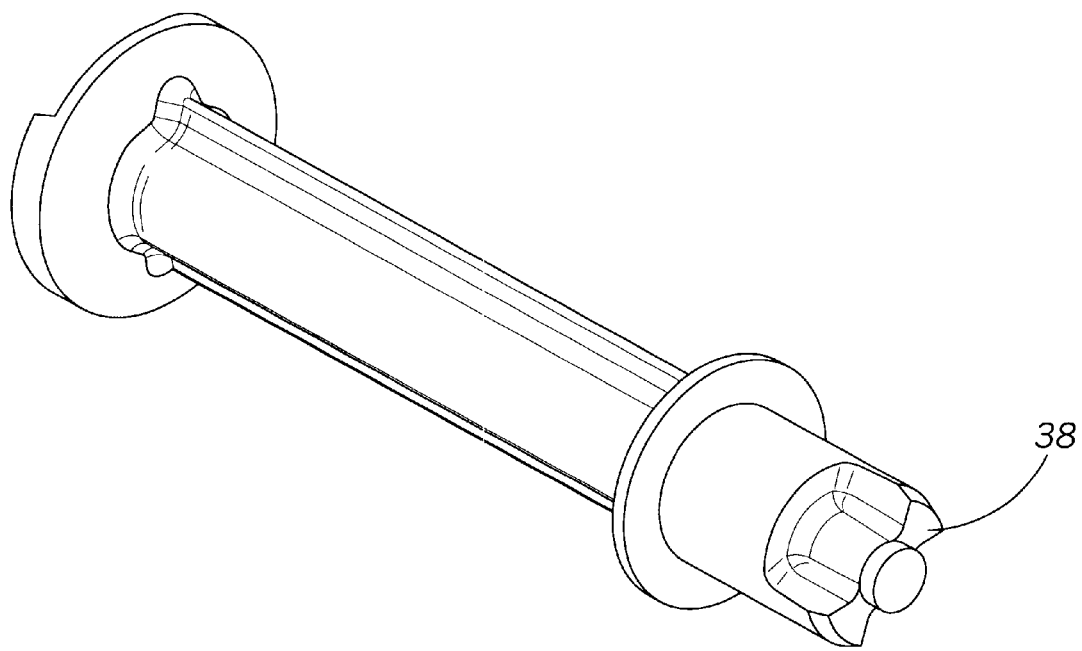
FIG. 4 is a perspective view of the opposite side of the shaft of FIG. 3.

FIG. 4 is a perspective view of the shaft 30 showing a bow-tie shaped pin 38 on the shaft 30 which mates to a bow tie shaped socket 40 on the body portion 12 (shown in FIG. 2) such that there is no relative movement between the shaft 30 and the body portion 12.

Figure 5:
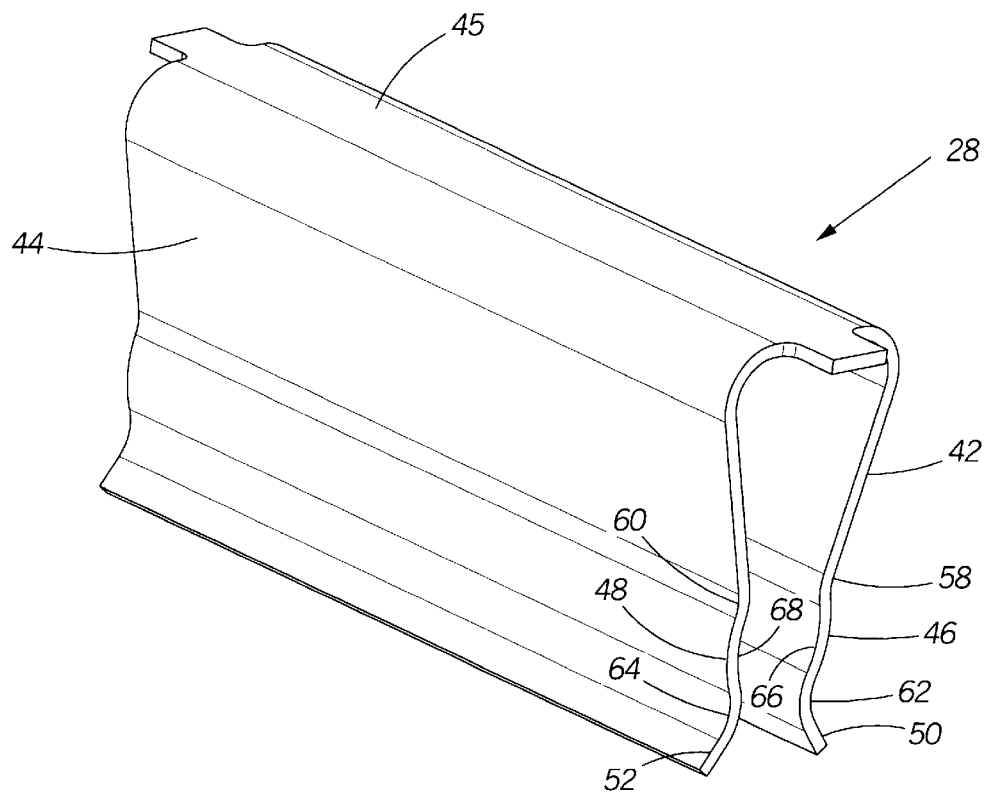
FIG. 5 is a perspective view of a U-shape spring that forms part of the hinge control mechanism illustrated in FIG. 2.

The U-shaped spring 28, as shown in FIG. 5, is a unitary metal piece made of a high tensile strength material such as beryllium copper. It has a first spring arm 42 and a second spring arm 44. At one end, these spring arms are spaced apart from each other, and at their opposite end they are joined together by a cross-piece 45, thus forming a U-shape. The first spring arm 42 includes a first concave segment 46 for engaging the shaft 30, and a flared end 50 for receiving the shaft 30 between the first spring arm 42 and the second spring arm 44. The second spring arm 44 includes a second concave segment 48 for engaging the shaft 30, and a flared end 52 for receiving the shaft 30 between the first spring arm 42 and the second spring arm 44.

The concave segment 46 of the first spring arm 42 includes a first end point 58, a second end point 62, and a center point 66. The concave segment 48 of the second spring arm 44 includes a first end point 60, a second end point 64, and a center point 68.

With the hinge control mechanism 22 in its unassembled condition, the spring arms 42 and 44 are biased apart from each other. To assemble the hinge control mechanism 22, the shaft 30 is pressed between the flared ends 50 and 52, causing the spring arms 42 and 44 to be urged apart to insert the shaft 30, the shaft 30 then being engaged into place by the first concave segment 46 and the second concave segment 48.

Figure 6:
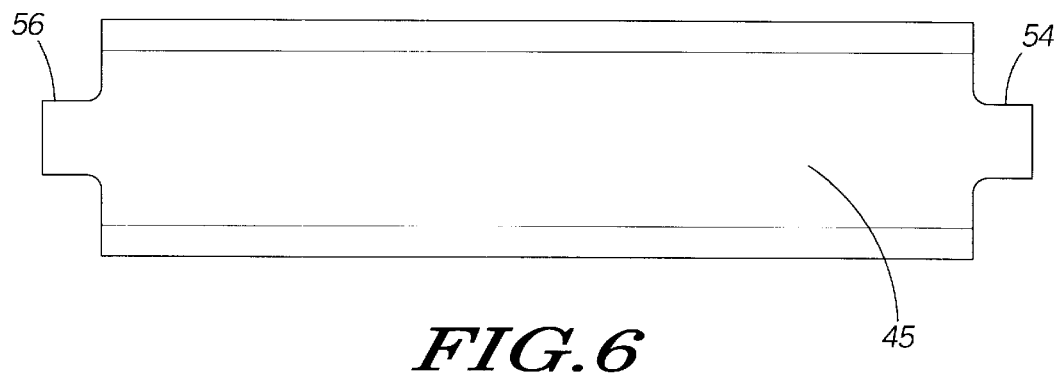
FIG. 6 is a top side view of the U-shaped spring of FIG. 5.

FIG. 6 is a top view of the U-shaped spring 28 of FIG. 4. Tabs 54 and 56 project from opposite ends of the U-shaped spring 28. The tabs fit into slots (not shown) formed in the flip portion 14 for holding the U-shaped spring 28.

Referring briefly to FIG. 1, the flip portion 14 has an interior space including slots for receiving the tabs 54 and 56 of the U-shaped spring 28 (not shown). The body portion 12 has a bow tie shaped socket 40 for fixedly attaching the shaft 30 to the body portion 12. The control of the rotational movement between the flip portion 14 and the body portion 12 in the direction of the arrow 26 occurs when the shaft 30 is then assembled to the U-shaped spring 28, forming the hinge control mechanism 22.

One of the functions of the hinge control mechanism 22 is to firmly hold the flip portion 14 in a closed position so as to avoid being accidentally opened. This is accomplished by coaction between the protuberances 34 and 36 of the shaft 30 and the spring arms 42 and 44 of the U-shaped spring 28 as illustrated in FIG. 7. In a preferred embodiment, the coaction between the shaft 30 and the U-shaped spring 28 is a moment (equal to the force times the distance from the center) generated by forces that pass through a point that is some distance from the axis of the shaft 30 which is also the axis of rotation of the flip portion 14.

When the flip portion 14 is moved, the U-shaped spring 28 moves with it. The shaft 30 remains stationary. When the flip portion 14 is being closed, the spring arms 42 and 44 rotate around the shaft 30 until they reach the fully closed position. In this position, (FIG. 7) the protuberance 34 bears on the end point 62 of the first concave segment 46 of the first spring arm 42, deflecting it slightly; similarly, the protuberance 36 bears on the end point 60 of the second concave segment 48 of the second spring arm 44, deflecting it slightly. This deflection of the spring arms creates a relatively strong closing force that resists opening of the flip portion 14, thereby avoiding accidental opening.

As the flip portion 14 is opened against the force of the springs, the spring arms rotate in a clockwise direction. Soon, as illustrated in FIG. 8, the spring arms reach a position of maximum deflection, where they are perpendicular to protuberances 34 and 36. At this position, protuberance 34 is contacting the center point 66 of the first concave segment 46 of the spring arm 42; similarly, protuberance 36 is contacting the center point 68 of the second concave segment 48 of the spring arm 44. This position of maximum deflection occurs when the flip portion 14 is open about 30 degrees. In a preferred embodiment, the forces are directed through the axis of rotation and therefore no moment is generated. The position of the flip portion 14 is unstable and any slight force in either direction will cause the flip portion 14 to either close or open to the preset position shown in FIG. 1.

In the open position, the flip portion 14 is opened at an angle of about 90 degrees relative to the body portion 12. In this position, coaction between the spring arms and the protuberances 34 and 36 generates a relatively strong force that holds the flip portion 14 open. As illustrated in FIG. 9, in the open position, the protuberance 34 is contacting the end point 58 of the concave segment 46 of the spring arm 42; and the protuberance 36 is contacting the end point 64 of the concave segment 48 of the spring arm 44. If the flip portion 14 (along with the spring arms) should be moved slightly from the open position toward the closed position, the spring arms 42 and 44 would be rotated in a counter-clockwise direction. This rotation is hindered by the opposing forces created by the protuberances and the end points of the concave segments. Consequently, this action creates a relative strong force that resists closing of the flip portion 14, and makes accidental closing of the flip portion 14 unlikely.

When the flip portion 14 and the spring arms 42 and 44 have been rotated to the beginning of the read position, the rounded surface 35 of the shaft surface 32 is in contact with and rotates within the first concave segment 46; similarly the rounded surface 37 of the shaft surface 32 is in contact and rotates within the second concave segment 48. In a preferred embodiment of the invention, the rounded surface 35 has a radius and the first concave segment 46 has a radius, and the two radii are substantially equal. Similarly, the rounded surface 37 has a radius and the second concave segment 48 has a radius, and the two radii are substantially equal. This coupling of the rounded surfaces and concave segments positions the spring arms to minimum deflection, therefore, generating a relatively small and constant holding force to resist further rotation of the flip portion 14. In a preferred embodiment, when the flip portion is rotated between 90 and 170 degrees the forces generated by the spring arms 42 and 44 on the shaft 30 pass through the axis of the shaft 30 such that there is no moment created. The feel generated by the spring arms 42 and 44 when they are moved within this region as depicted in FIG. 9 is smooth and continuous, permitting the flip portion 14 to be easily moved and stopped at any desired position within the region.

FIG. 10 is an additional embodiment of the described hinge control mechanism 22 in which an elastomeric material 70 is applied to the concave segments 46 and 48 to increase friction between the concave segments and the shaft during rotational movement. FIG. 11 an additional embodiment of the described hinge control mechanism 22 in which an elastomeric material 72 is applied to the shaft rounded surfaces 35 and 37 to increase friction between the concave segments and the shaft during rotational movement.

All the functions described above are performed by a hinge control mechanism that is relatively small. Its small size makes it particularly useful for small electronic devices that use a flip and that need a small, reliable hinge control mechanism.

Although the invention has been described in terms of preferred embodiments, it will be obvious to those skilled in the art that various alterations and modifications may be made without departing from the invention. Accordingly, it is intended that all such alterations and modifications be considered as within the spirit and scope of the invention as defined by the appended claims.

We claim:

1. In an electronic device having a foldable housing comprising a body portion and a flip portion, a hinge control mechanism for rotatably coupling the flip portion to the body portion, comprising:
   (a) a shaft fixedly attached to the body portion, the shaft having a shaft surface with an elliptical cross section which extends along the axis of the shaft, the shaft surface comprising:
      a pair of oppositely spaced protuberances, and
      a pair of oppositely spaced rounded surfaces; and
   (b) a U-shaped spring attached to the flip portion, said U-shaped spring having first and second spring arms, the first spring arm including a first concave segment, the second spring arm including a second concave segment, wherein the shaft is tangentially assembled and held between the first and second concave segments and a relative rotational motion between the shaft and the spring arms causes the protuberances to bear on the first and second concave segments and deflect the spring arms.

2. A hinge control mechanism as set forth in claim 1, wherein when it is in contact with the concave segment a rounded surface of the shaft rotates within a concave segment.

3. A hinge control mechanism as set forth in claim 2, wherein each of the pair of oppositely spaced rounded surfaces has a radius, wherein each of the first and second concave segments has a radius, and wherein the radius of each of the pair of oppositely spaced rounded surfaces is substantially equal to the radius of the first and the second concave segments.

4. A hinge control mechanism as set forth in claim 1, wherein the first and second spring arms have flared ends for receiving the shaft between the first and second spring arms.

5. A hinge control mechanism as set forth in claim 1, wherein a material is applied to the first and second concave segments to increase friction between the first and second concave segments and the rotational movement of the shaft.

6. A hinge control mechanism as set forth in claim 1, wherein a material is applied to the shaft to increase friction between the first and second concave segments and the shaft during rotational movement of the shaft.

7. In an electronic device having a foldable housing, said foldable housing having a body portion and a flip portion, a hinge control mechanism for rotatably coupling the flip portion to the body portion, comprising:
   (a) a shaft fixedly attached to the body portion, the shaft having first and second protuberances situated between first and second rounded surfaces; and
   (b) a U-shaped spring attached to the flip portion, said U-shaped spring having first and second spring arms that are spaced apart from each other and adapted to receive the shaft between the first and second spring arms, the first spring arm including a first concave segment having first and second end points and a center point, the second spring arm including a second concave segment having first and second end points and a center point, wherein the shaft is held between the first and second concave segments, and wherein the first protuberance contacts an end point of the first concave segment and the second protuberance contacts an end point of the second concave segment when the flip portion is closed with relation to the body portion, so as to exert a closing force on the flip portion.

8. A hinge control mechanism as set forth in claim 7, wherein the first protuberance contacts the center point of the first concave segment and the second protuberance contacts the center point of the second concave segment when the flip portion is partially opened with relation to the body portion, so that the position of the flip portion is unstable.

9. A hinge control mechanism as set forth in claim 7, wherein the first rounded surface is in contact with the first concave segment, and the second rounded surface is in contact with the second concave segment, when the flip portion is opened at an angle of about ninety degrees relative to the body portion, so as to exert a relatively strong force holding the flip portion open and a relatively smaller holding force when the flip portion is rotated beyond about ninety degrees relative to the body portion.

* * * * *